United States Patent [19]

Iwane et al.

[11] Patent Number: 6,123,854
[45] Date of Patent: *Sep. 26, 2000

[54] FLOCCULANT COMPOSITIONS AND WATER TREATMENT METHOD USING THE SAME

[75] Inventors: Nobuo Iwane, Ibaraki; Teruo Aoe, Okayama; Takuma Miyazawa, Kamiina-gun; Shigemi Aruga, Kamiina-gun; Minoru Tanaka, Kamiina-gun; Yoshitaro Tanaka, Nishinomiya, all of Japan

[73] Assignee: Hinomaru Kogyo Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/101,338

[22] PCT Filed: Nov. 7, 1997

[86] PCT No.: PCT/JP97/04073

§ 371 Date: Jul. 8, 1998

§ 102(e) Date: Jul. 8, 1998

[87] PCT Pub. No.: WO98/21148

PCT Pub. Date: May 22, 1998

[30] Foreign Application Priority Data

Nov. 8, 1996 [JP] Japan ..................................... 8-313072

[51] Int. Cl.$^7$ ..................................................... B01D 21/01
[52] U.S. Cl. ........................... 210/716; 210/723; 210/724
[58] Field of Search ..................................... 210/702, 716, 210/717, 723, 724, 725, 726, 727, 906

[56] References Cited

U.S. PATENT DOCUMENTS

| 2,204,812 | 6/1940 | Muskat | 210/723 |
| 5,234,603 | 8/1993 | Potts | 210/723 |

FOREIGN PATENT DOCUMENTS

| 33903 | 8/1981 | European Pat. Off. . |
| 1699948 | 12/1991 | U.S.S.R. . |
| 1801953 | 3/1993 | U.S.S.R. . |

*Primary Examiner*—David A. Simmons
*Assistant Examiner*—Frank Lawrence
*Attorney, Agent, or Firm*—Millen, White, Zelano & Branigan, P.C.

[57] ABSTRACT

A flocculant composition includes an aqueous solution of a mixture of titanyl sulfate or titanium tetrachloride with a water-soluble, neutral alkali or alkaline earth metal salt at a titanium to alkali or alkaline earth metal salt ratio calculated as $TiO_2$ of from 0.25:1 to 0.0002:1 by weight. The flocculant composition may further contain a water soluble iron salt at a titanium to iron ratio calculated as $TiO_2$ and $Fe_2O_3$ of from 1:1 to 40:1 by weight, or a water-soluble zirconium salt at a titanium to zirconium ratio calculated as $TiO_2$ and $ZrO_2$ of from 1:1 to 40:1 by weight, or a water soluble aluminum salt at a titanium to aluminum ratio calculated as $TiO_2$ and $Al_2O_3$ of from 1:1 to 40:1 by weight. A water-clarifying method includes the addition of an aqueous solution of titanyl sulfate or titanium tetrachloride to raw water in combination with a water-soluble, neutral alkali or alkaline earth metal with or without further combination with a water soluble iron, zirconium or aluminum salt.

25 Claims, No Drawings

FLOCCULANT COMPOSITIONS AND WATER TREATMENT METHOD USING THE SAME

FIELD OF THE INVENTION

This invention relates to a new flocculant composition for use in the purification of raw water. It also relates to a method of water treatment for removing impurities dissolved or suspended in raw water.

BACKGROUND OF THE INVENTION

A variety of flocculants are used in the water treatment for municipal and industrial water as well as a variety waste water including sewage and waste water originating from chemical, metallurgical, dyeing, starch and other industries. Conventionally used for clarifying raw or waste water by separating suspended matter are inorganic flocculants such as ferrous sulfate, ferric sulfate, chlorinated copper as ($Fe_2(SO_4)_3 \cdot FeCl_2$), ferrous chloride, ferric chloride, alums, polymeric aluminum chloride and the like. Auxiliary flocculants are also used including slaked lime, activated silica, sodium silicate and bentonite.

JP-B-35012733 discloses the use of titanium chloride in the rapid clarification of waste water such as cellulose pulp-waste liquor and coal dressing-waste water. JP-A-49007178 discloses a flocculant composition containing aluminum sulfate and titanium sulfate. JP-A-56126483 discloses that dissolved phosphates in effluent are removed as precipitates by adding an aqueous composition containing ferrous sulfate, ferric sulfate, aluminum sulfate, magnesium sulfate and titanyl sulfate. JP-A-59049811 discloses a water processing method using titanium chloride, ferric chloride, ferric sulfate, aluminum sulfate and aluminum chloride either alone or in combination. JP-A-03213194 discloses that the flock-making efficiency of dyeing waste water is enhanced by combining an inorganic flocculant with an alkaline earth metal salt. JP-A-07108105 discloses water-blooming Microcystis and Anabaena cells growing in closed inland water are aggregated by treating the water with one or more inorganic salts selected from the group consisting of polymeric iron sulfate, polymeric iron chloride, ferric sulfate, ferric chloride, calcium chloride, magnesium chloride, magnesium sulfate, aluminum sulfate and aluminum chloride. Mizushori Gijitsu (Water treatment Technology) 5(12):15, 1964 reports the use of titanium chloride-base flocculant in the reduction of Fe contents in river water. It also reports that the iron-removing efficiency of titanium chloride is maximum in an acidic pH range between 3.5 and 5.5 but a soluble titanium compound remains in the supernatant.

Aluminum- and iron-based inorganic flocculants generally have an optimal flock-making pH range, namely neutral range for aluminum salts and acidic to neutral range for iron salts. In contrast, titanium salts have two optimal flock-making pH ranges, one in acidic side and the other in alkaline side separated by neutral range within which the titanium salt exhibits no or little flock-making function but is hydrolyzed into colloidal products. Accordingly, when attempting to clarify raw water including suspended clay particles with a titanium salt in the neutral pH range between 6 and 8, the titanium salt will hardly make coarse flocks of suspending matter but will remain in water mainly as a colloidal hydrolyzate which increases load to settling and filtering facilities. It is mainly for this reason that have precluded to date the use of titanium salts for producing municipal water in which water processing in the neutral pH range is essential.

A need exists for a titanium-based flocculant composition and a water processing method which can eliminate or alleviate various problems as discussed supra.

SUMMARY OF THE INVENTION

As stated before, aluminum- or iron-based flocculants have an optimal pH in the neutral or nearly neutral region in flock-making ability, while titanium salts are hardly capable of making flocks in the neutral pH region and remains as colloidal hydrolyzate in water. The present invention has its basis on a discovery that titanium salts may function as a flocculant in the neutral pH region when an amount of a water-soluble alkali or alkaline earth metal salt is added together with the titanium salt.

In a composition aspect, therefore, the present invention provides a flocculant composition comprising an aqueous solution of a mixture of titanyl sulfate or titanium tetrachloride with a water-soluble, neutral alkali or alkaline earth metal salt at a titanium to alkali or alkaline earth metal salt ratio calculated as $TiO_2$ of from 0.25:1 to 0.0002:1, preferably from 0.25:1 to 0.01:1 by weight.

In a preferred embodiment, said alkali or alkaline earth metal salt is sodium chloride, sodium sulfate, potassium chloride, calcium chloride, magnesium chloride or magnesium sulfate.

In another composition aspect, the present invention provides a flocculant composition comprising an aqueous solution of a mixture of titanyl sulfate or titanium tetrachloride, a water-soluble iron salt and a water-soluble, neutral alkali or alkaline earth metal salt at a titanium to iron ratio calculated as $TiO_2$ and $Fe_2O_3$ of from 1:1 to 40:1 by weight and a titanium to alkali or alkaline earth metal salt ratio calculated as $TiO_2$ as defined above.

In a preferred embodiment, said water-soluble iron salt is ferrous sulfate, ferric sulfate, ferrous chloride, ferric chloride or polymeric ferric chloride.

In a further composition aspect, the present invention provides a flocculant composition comprising an aqueous solution of a mixture of titanyl sulfate or titanium tetrachloride, a water-soluble zirconium salt and a water-soluble, neutral alkali or alkaline earth metal salt at a titanium to zirconium ratio calculated as $TiO_2$ and $ZrO_2$ of from 1:1 to 40:1 by weight and at a titanium to alkali or alkaline earth metal salt ratio calculated as $TiO_2$ as defined above.

In a preferred embodiment, said water-soluble zirconium salt is zirconium dichloride oxide of the formula: $ZrOCl_2$, zirconium chloride hydroxide oxide of the formula; $ZrO(OH)Cl$, or zirconium sulfate.

In a still further composition aspect, the present invention provides a flocculant composition comprising an aqueous solution of a mixture of titanyl sulfate or titanium tetrachloride, a water-soluble aluminum salt and a water-soluble, neutral alkali or alkaline earth metal salt at a titanium to aluminum ratio calculated as $TiO_2$ and $Al_2O_3$ of from 1:1 to 40:1 by weight and at a titanium to alkali or alkaline earth metal salt ratio calculated as $TiO_2$ as defined above.

In a preferred embodiment, said water-soluble aluminum salt is aluminum chloride, polymeric aluminum chloride or aluminum sulfate.

In the method aspect, the present invention provides a water clarifying method comprising the steps of: (a) adding into raw water with stirring an aqueous solution of titanyl sulfate or titanium tetrachloride and a water-soluble neutral alkali or alkaline earth metal salt at a titanium to alkali or alkaline earth metal salt ratio calculated as $TiO_2$ from 0.25:1 to 0.0002:1 by weight, preferably from 0.25:1 to 0.01:1 by weight; (b) allowing suspended matter in the raw water to aggregate into flocks at a pH from 5.6 to 8.7; (c) allowing the flocks to settle; and (d) separating the supernatant from the flocks.

In a preferred embodiment, the water-soluble, neutral alkali or alkaline earth metal is sodium chloride, sodium sulfate, potassium chloride, calcium chloride, magnesium chloride or magnesium sulfate.

In another embodiment, a water-soluble iron salt such as ferrous sulfate, ferric sulfate, ferrous chloride, ferric chloride or polymeric ferric chloride is added to the raw water in step (a) at a titanium to iron ratio calculated as $TiO_2$ and $Fe_2O_3$ of from 1:1 to 40:1 by weight.

In a further embodiment, a water-soluble zirconium salt such as zirconium dichloride oxide of the formula: $ZrOCl_2$, zirconium chloride hydroxide oxide of the formula: $ZrO(OH)Cl$ or zirconium sulfate is added to the raw water in step (a) at a titanium to zirconium ratio calculated as $TiO_2$ and $ZrO_2$ of from 1:1 to 40:1 by weight.

In a still further aspect, a water-soluble aluminum salt such as aluminum chloride, polymeric aluminum chloride or aluminum sulfate is added to the raw water in step (a) at a titanium to aluminum ratio calculated as $TiO_2$ and $Al_2O_3$ of from 1:1 to 40:1 by weight.

Preferably, the aqueous solution of titanyl sulfate or titanium tetrachloride is added to the raw water is step (a) to a titanium concentration calculated as $TiO_2$ from 1 to 200 mg/L.

Other features and advantages of the present invention will become apparent as the description proceeds.

DETAILED DISCUSSION

Titanyl sulfate has the chemical formula: $TiOSO_4 \cdot 2H_2O$ and occurs as white crystals. Commercially available titanyl sulfate generally has the following analysis:

| | |
|---|---|
| $TiO_2$ | 25–30 wt. % |
| Total $H_2SO_4$ | 47–53 wt. % |
| Unbound $H_2SO_4$ | about 10 wt. % |
| Unbound $H_2O$ | about 10 wt. % |

Any commercial product having the above analysis may be used in the present invention to advantage.

Titanium tetrachloride is easily hydrolyzed in water and, therefore, its aqueous solution contains orthotitanic acid and hydrogen chloride. The term "aqueous solution of titanium tetrachloride" as used herein refers to an aqueous solution containing such hydrolyzates of titanium tetrachloride. Commercial products having a titanium content from 5 to 20 wt. % are available in the market and may be used in the present invention to advantage.

Both titanyl sulfate and titanium tetrachloride produce insoluble colloidal particles of $TiO_2$ in water in the neutral pH region. This precludes titanyl sulfate or titanium tetrachloride from using in the production of municipal water in particular wherein it is imperative for both raw water and product water to have a pH between about 6.0 and about 8.0. However, the titanium salt may function as a flocculant in the neutral pH region when used in combination with a certain amount of a water-soluble, neutral alkali or alkaline earth metal salt such as sodium chloride, sodium sulfate, potassium chloride, calcium chloride, magnesium chloride or magnesium sulfate. The amount of the alkali or alkaline earth metal salt is such that the ratio of titanium calculated as $TiO_2$ to the alkali or alkaline earth metal salt is between 0.25:1 and 0.0002:1, preferably between 0.25:1 to 0.01:1 by weight. This enables the titanium salt having no known physiological toxicity to be used in the treatment of raw water particularly for municipal water in place of or in addition to conventional aluminum-based or iron-based flocculants without increasing production cost significantly.

The above combination may further comprise a water soluble iron salt, a water soluble zirconium slat or a water soluble aluminum salts. Examples thereof include ferrous sulfate, ferric sulfate, ferrous chloride, ferric chloride, polymeric ferric chloride, zirconium dichloride oxide of the formula: $ZrOCl_2$, zirconium chloride hydroxide oxide of the formula: $ZrO(OH)Cl$, zirconium sulfate, alminum chloride, polymeric aluminum chloride or aluminum sulfate. The amount of the iron, zirconium or aluminum salt relative to the titanium salt is such that the ratio of titanium calculated as $TiO_2$ to Fe, Zr or Al as $Fe_2O_3$, $ZrO_2$ or $Al_2O_3$ is between 1:1 and 40:1 by weight. The ratio of titanium as $TiO_2$ to the alkali or alkaline earth metal salt is the same as before.

In use stock solutions of respective chemicals are prepared. Although these stock solutions may be added to raw water separately or concurrently, it is convenient to formulate a premix of the stock solutions having known concentrations and known ratios of respective chemicals. Then the stock solutions or the premix are added to raw water with stirring. If necessary, a conventional organic flocculant may also be added. At least a substantial portion of suspended matter in the raw water will aggregate into flocks when the pH of water lies within the range between 5.6 and 8.7 after the addition of the chemicals. After allowing the flocks to settle below a supernatant layer, product water may be recovered by separating the supernatant from the flocks.

The exact amounts of respective chemicals will vary depending upon the nature and quantity of suspended matter in raw water and also the quality of raw water and/or product water including the alkalinity of raw water or the desired pH range of product water. It is preferred in general that the aqueous solution of titanyl sulfate or titanium tetrachloride be added to raw water to a concentration calculated as $TiO_2$ from 1 to 200 mg/L. This concentration will vary, as stated above, depending upon the alkalinity of raw water and the desired pH range of the product water. In case of raw water having an acceptable alkalinity for municipal water a titanium concentration calculated as $TiO_2$ from 1 to 10 mg/L will be sufficient to aggregate suspended matter within a pH range between 6.0 and 8.0. In case of treating various waste water, higher titanium concentrations up to 200 mg or more as $TiO_2$/L will be required depending upon the desired pH range of treated water.

EXAMPLE

A series of tests were carried out under the following conditions throughout the tests.

(1) Apparatus

A jar tester, Model JMD-8 available from Miyamoto Riken Kogyo equipped with a 500 ml glass beaker, a stirrer with a pair of flat blade paddles each having a size of 68 mm length×17 mm width vertically disposed along the rotating axis and an Eppendolf micropipette.

(2) Stirring Condition

Rapid stirring at 110 rpm for 10 minutes and then slow stirring at 40 rpm for 10 minutes followed by a settling time for 10 minutes.

(4) Temperature

Room temperature.

(5) Raw Water

An artificial water having a turbidity of 20 and a pH of 7.0 prepared by suspending elutriated kaolin particles (Kanto Kagaku) in a mixture of municipal water and pure water having an alkalinity of 25–30 ppm.

(6) Stock Solutions

| Name | Concentration, g/L |
|---|---|
| $TiOSO_4$, TM Crystals from Tayca Corporation | 150 as $TiO_2$ |
| $TiCl_4$, aqueous solution, from Toho Titanium | 150 as $TiO_2$ |
| $Al_2(SO_4)_3$, Taimei Chemical | 100 and 10 as $Al_2O_3$ |
| Polymeric aluminum chloride, Taimei Chemical | 100 and 10 as $Al_2O_3$ |
| $FeCl_3$, Reagent grade from Kanto Chemical | 74 and 15 as $Fe_2O_3$ |
| $Fe_2(SO_4)_3$, Reagent grade from Kanto Chemical | 60 as $Fe_2O_3$ |
| $ZrOCl_2$, Daiichi Rare Elements | 104 and 15 as $ZrO_2$ |
| $ZrO(OH)Cl$, Daiichi Rare Elements | 116 as $ZrO_2$ |
| $Zr(SO_4)_2$, Daiichi Rare Elements | 96 as $ZrO_2$ |
| $CaCl_2$, Reagent grade from Kanto Chemical | 150 as $CaCl_2$ |
| $MgCl_2$, Reagent grade from Kanto Chemical | 150 as $MgCl_2$ |
| $MgSO_4$, Reagent grade from Kanto Chemical | 150 as $MgSO_4$ |
| KCl, Reagent grade from Kanto Chemical | 150 as KCl |
| $Na_2SO_4$, Reagent grade from Kanto Chemical | 150 as $Na_2SO_4$ |
| NaCl, Reagent grade from Kanto Chemical | 150 as NaCl |

(7) Analysis

A 200 ml aliquot was taken for testing from the supernatant after standing for 10 minutes.

Turbidity

Integrating-sphere turbidimeter Model SEP-DT-501D (Mitsubishi Chemical) was used.

pH

Standard calorimetric method for municipal water was used.

Residual (total) Ti and Al

An amount of $HNO_3$ was added to the sample to make a 1% solution. After standing for 12 hours, the solution was tested for residual Ti and Al using ICP luminescence spectrophotometry.

Dissolved Ti and Al

The sample was filtered through a 0.5 μm PTFE filter and then the above method was followed to determine dissolved Ti and Al in the sample.

Example 1

To 500 ml of raw water were added varying amounts of $TiOSO_4$ and polymeric aluminum chloride at varying ratios shown in Table 1 and Table 2. Turbidity, pH, dissolved Ti and Al were determined in each test and the results are shown in Table 1 and Table 2.

TABLE 1

| Amount of addition | Turbidity (degree) $TiO_2/Al_2O_3$ weight ratio | | | | |
|---|---|---|---|---|---|
| (mg/L as $TiO_2$) | 40 | 20 | 5 | 1.6 | 0.3 |
| 60 | — | — | — | 1.3 | 6.4 |
| 50 | — | — | — | 1.4 | 6.6 |
| 40 | — | — | — | 1.9 | 9.7 |
| 30 | — | — | — | 2.8 | 8.1 |

TABLE 1-continued

| Amount of addition | Turbidity (degree) $TiO_2/Al_2O_3$ weight ratio | | | | |
|---|---|---|---|---|---|
| (mg/L as $TiO_2$) | 40 | 20 | 5 | 1.6 | 0.3 |
| 20 | No flock | 20 | 20 | 4.9 | No Flock |
| 8 | 0.4 | 0.5 | 0.8 | — | — |
| 6 | 0.7 | 0.3 | 0.4 | — | — |
| 4 | 1.9 | 1.2 | 0.1 | — | — |
| 2 | No flock | No Flock | 1.0 | — | — |

TABLE 2

| Amount of addition | pH, dissolved Ti and Al (mg/L as metal) at $TiO_2/Al_2O_3$ weight ratio of 5 | | |
|---|---|---|---|
| (mg/L as $TiO_2$) | pH | Ti | Al |
| 8 | 6.1 | 0.023 | 0.011 |
| 6 | 6.3 | 0.027 | 0.014 |
| 4 | 6.6 | 0.022 | 0.015 |
| 2 | 6.8 | 0.019 | 0.025 |

Table 1 and Table 2 show that when the relative proportion of titanium and aluminum salts calculated as $TiO_2/Al_2O_3$ is 5, the best results are achieved in terms of turbidity, pH and dissolved Ti and Al in the supernatant.

Example 2

Example 1 was followed except that $TiOSO_4$ was replaced with $TiCl_4$. Similar results were obtained as shown in Table 3 below.

TABLE 3

| Amount of addition | Turbidity (degree) $TiO_2/Al_2O_3$ weight ratio | | | | |
|---|---|---|---|---|---|
| (mg/L as $TiO_2$) | 40 | 20 | 5 | 1.6 | 0.3 |
| 60 | — | — | — | 1.1 | 6.1 |
| 50 | — | — | — | 1.1 | 6.2 |
| 40 | — | — | — | 1.6 | 9.0 |
| 30 | — | — | — | 2.5 | 7.8 |
| 20 | No flock | 20 | 20 | 4.6 | No Flock |
| 8 | 0.6 | 0.5 | 0.2 | — | — |
| 6 | 0.4 | 0.3 | 0.2 | — | — |
| 4 | 2.0 | 1.2 | 0.1 | — | — |
| 2 | No flock | No Flock | 0.6 | — | — |

Example 3

Examples 1 and 2 were followed except that polymeric aluminum chloride was replaced with $FeCl_3$ at a constant $TiO_2/Fe_2O_3$ ratio of 5. Similar results were obtained by the replacement of aluminum salt with iron salts as shown in Table 4 below.

TABLE 4

Turbidity (degree) and pH at $TiO_2/Fe_2O_3 = 5$

| Amount of addition | TiOSO$_4$ | | TiCl$_4$ | |
|---|---|---|---|---|
| (mg/L as TiO$_2$) | Turbidity | pH | Turbidity | pH |
| 8 | 0.6 | 6.4 | 0.2 | 6.3 |
| 6 | 0.5 | 6.5 | 0.5 | 6.5 |
| 4 | 1.4 | 6.8 | 1.1 | 6.6 |
| 2 | No flock | 6.9 | No flock | 6.9 |

Example 4

Example 1 was followed except that polymeric aluminum chloride was replaced with. ZrOCl$_2$ at a TiO$_2$/ZrO$_2$ ratio of 5. The results show that the zirconium salt is also effective as an auxiliary flocculant in combination with a titanium salt as shown in Table 5 below.

TABLE 5

Turbidity (degree) and pH at $TiO_2/ZrO_2 = 5$

| Amount of addition | TiOSO$_4$ | | TiCl$_4$ | |
|---|---|---|---|---|
| (mg/L as TiO$_2$) | Turbidity | pH | Turbidity | pH |
| 8 | 2.1 | 6.4 | 1.1 | 6.3 |
| 6 | 14.9 | 6.5 | 3.4 | 6.5 |
| 4 | No flock | 6.7 | No flock | 6.7 |
| 2 | No flock | 6.9 | No flock | 6.9 |

Example 5

The effects of co-addition of MgCl$_2$ or CaCl$_2$ to the binary systems of TiCl$_4$ plus polymeric aluminum chloride (PAC) (TiO$_2$/Al$_2$O$_3$=5), TiCl$_4$ plus FeCl$_3$ (TiO$_2$/Fe$_2$O$_3$=5) and TiCl$_4$ plus ZrOCl$_2$ (TiO$_2$/ZrO$_2$=5) on the turbidity and pH of the supernatant were studied at verying TiO$_2$/MgCl$_2$ and TiO$_2$/CaCl$_2$ ratios. The results are shown in Table 6 to Table 12. The co-addition of MgCl$_2$ or CaCl$_2$ decreased the turbidity of supernatant while maintaining the pH between 6.0 to 7.0.

TABLE 6

$TiO_2/MgCl_2 = 1$

| | Binary system | | | | | |
|---|---|---|---|---|---|---|
| Amount of addition | TiO$_2$/Al$_2$O$_3$ at 5 | | TiO$_2$/Fe$_2$O$_3$ at 5 | | TiO$_2$/ZrO$_2$ at 5 | |
| (mg/L as TiO$_2$) | Turbidity | pH | Turbidity | pH | Turbidity | pH |
| 8 | 0.2 | 6.3 | 0.1 | 6.2 | 0.7 | 6.4 |
| 6 | 0.1 | 6.5 | 0.4 | 6.4 | 2.1 | 6.5 |
| 4 | 0.1 | 6.6 | 1.9 | 6.5 | No flock | 6.7 |
| 2 | 0.4 | 6.9 | No flock | 6.7 | No flock | 6.9 |

TABLE 7

$TiO_2/MgCl_2 = 1$

| | Binary system | | | | | |
|---|---|---|---|---|---|---|
| Amount of addition | TiO$_2$/Al$_2$O$_3$ at 5 | | TiO$_2$/Fe$_2$O$_3$ at 5 | | TiO$_2$/ZrO$_2$ at 5 | |
| (mg/L as TiO$_2$) | Turbidity | pH | Turbidity | pH | Turbidity | pH |
| 8 | 0.3 | 6.3 | 0.3 | 6.2 | 0.3 | 6.2 |
| 6 | 0.1 | 6.5 | 0.2 | 6.4 | 0.4 | 6.4 |
| 4 | 0.1 | 6.6 | 0.6 | 6.6 | 1.3 | 6.6 |
| 2 | 0.7 | 6.9 | 3.7 | 6.8 | No flock | 6.8 |

TABLE 8

$TiO_2/MgCl_2 = 0.01$

| | Binary system | | | | | |
|---|---|---|---|---|---|---|
| Amount of addition | TiO$_2$/Al$_2$O$_3$ at 5 | | TiO$_2$/Fe$_2$O$_3$ at 5 | | TiO$_2$/ZrO$_2$ at 5 | |
| (mg/L as TiO$_2$) | Turbidity | pH | Turbidity | pH | Turbidity | pH |
| 8 | 0.2 | 6.4 | 0.2 | 6.2 | 0.5 | 6.3 |
| 6 | 0.2 | 6.5 | 0.3 | 6.5 | 0.5 | 6.5 |
| 4 | 0.1 | 6.7 | 0.4 | 6.6 | 0.6 | 6.7 |
| 2 | 0.5 | 6.9 | 0.6 | 6.8 | 1.2 | 6.8 |

TABLE 9

$TiO_2/CaCl_2 = 1$

| | Binary system | | | | | |
|---|---|---|---|---|---|---|
| Amount of addition | TiO$_2$/Al$_2$O$_3$ at 5 | | TiO$_2$/Fe$_2$O$_3$ at 5 | | TiO$_2$/ZrO$_2$ at 5 | |
| (mg/L as TiO$_2$) | Turbidity | pH | Turbidity | pH | Turbidity | pH |
| 8 | 0.2 | 6.3 | 0.2 | 6.2 | 0.8 | 6.4 |
| 6 | 0.3 | 6.5 | 0.4 | 6.4 | 1.9 | 6.5 |
| 4 | 0.1 | 6.6 | 1.9 | 6.5 | No flock | 6.6 |
| 2 | 0.2 | 6.9 | No flock | 6.7 | No flock | 6.9 |

TABLE 10

$TiO_2/CaCl_2 = 0.1$

| | Binary system | | | | | |
|---|---|---|---|---|---|---|
| Amount of addition | TiO$_2$/Al$_2$O$_3$ at 5 | | TiO$_2$/Fe$_2$O$_3$ at 5 | | TiO$_2$/ZrO$_2$ at 5 | |
| (mg/L as TiO$_2$) | Turbidity | pH | Turbidity | pH | Turbidity | pH |
| 8 | 0.2 | 6.3 | 0.1 | 6.2 | 0.7 | 6.4 |
| 6 | 0.1 | 6.5 | 0.3 | 6.4 | 0.5 | 6.3 |
| 4 | 0.2 | 6.6 | 0.5 | 6.6 | 0.9 | 6.5 |
| 2 | 0.6 | 6.9 | 2.7 | 6.8 | 11.7 | 6.8 |

TABLE 11

TiO$_2$/CaCl$_2$ = 0.01

| Amount of addition | Binary system | | | | | |
|---|---|---|---|---|---|---|
| | TiO$_2$/Al$_2$O$_3$ at 5 | | TiO$_2$/Fe$_2$O$_3$ at 5 | | TiO$_2$/ZrO$_2$ at 5 | |
| (mg/L as TiO$_2$) | Turbidity | pH | Turbidity | pH | Turbidity | pH |
| 8 | 0.2 | 6.3 | 0.3 | 6.2 | 0.7 | 6.3 |
| 6 | 0.2 | 6.5 | 0.4 | 6.6 | 0.5 | 6.4 |
| 4 | 0.3 | 6.6 | 0.4 | 6.6 | 0.6 | 6.7 |
| 2 | 0.6 | 6.9 | 1.1 | 6.8 | 1.1 | 6.9 |

Example 6

Example 5 was followed except that all of the three chemicals were added as a premix of their respective stock solutions instead of adding separately but concurrently as in Example 5. The results are shown in Table 12 and Table 13. As shown in the Tables, co-addition of chemicals as a premix was more effective than the separate addition of individual chemicals.

TABLE 12

TiO$_2$/CaCl$_2$ = 0.1

| Amount of addition | Binary system | | | | | |
|---|---|---|---|---|---|---|
| | TiO$_2$/Al$_2$O$_3$ at 5 | | TiO$_2$/Fe$_2$O$_3$ at 5 | | TiO$_2$/ZrO$_2$ at 5 | |
| (mg/L as TiO$_2$) | Turbidity | pH | Turbidity | pH | Turbidity | pH |
| 8 | 0.1 | 6.5 | 0.0 | 6.3 | 0.2 | 6.3 |
| 6 | 0.0 | 6.6 | 0.0 | 6.5 | 0.2 | 6.4 |
| 4 | 0.1 | 6.8 | 0.2 | 6.7 | 0.6 | 6.7 |
| 2 | 0.4 | 7.0 | 2.8 | 6.9 | 5.1 | 6.9 |

TABLE 13

TiO$_2$/CaCl$_2$ = 0.01

| Amount of addition | Binary system | | | | | |
|---|---|---|---|---|---|---|
| | TiO$_2$/Al$_2$O$_3$ at 5 | | TiO$_2$/Fe$_2$O$_3$ at 5 | | TiO$_2$/ZrO$_2$ at 5 | |
| (mg/L as TiO$_2$) | Turbidity | pH | Turbidity | pH | Turbidity | pH |
| 8 | 0.2 | 6.5 | 0.0 | 6.3 | 0.2 | 6.3 |
| 6 | 0.0 | 6.6 | 0.1 | 6.5 | 0.2 | 6.4 |
| 4 | 0.1 | 6.8 | 0.2 | 6.7 | 0.4 | 6.7 |
| 8 | 0.3 | 7.0 | 0.5 | 6.9 | 0.8 | 6.9 |

Example 7

The effects of the order of addition of individual chemicals on the supernatant turbidity were studied using the binary system of TiCl$_4$ plus PAC. In case of separate addition, rapid stirring at 110 rpm for 5 minutes was repeated twice when adding the first and second chemicals sequentially. In case of concurrent addition, the rapid stirring was extended for 10 minutes. The results are shown in Table 5. Concurrent addition was more effective than sequential addition as shown in Table 14.

TABLE 14

| Amount of addition | Supernatant turbidity | | |
|---|---|---|---|
| | TiO$_2$/Al$_2$O$_3$ at 5 | | |
| (mg/L as TiO$_2$) | 1st PAC, 2nd TiCl$_4$ | Reverse | Concurrent |
| 2 | 3.3 | 1.2 | 0.5 |
| 4 | 0.5 | 0.3 | 0.2 |
| 6 | 0.3 | 0.4 | 0.0 |
| 4 | 0.2 | 0.8 | 0.3 |
| 11 | 0.0 | 0.4 | 0.0 |
| 16 | 2.0 | 0.2 | No flock |
| 24 | No flock | No flock | No flock |

Example 8 (for Comparison)

The procedure of Example 1 was followed using TiCl$_4$, TiOSO$_4$, Al$_2$(SO$_4$)$_3$, PAC, FeCl$_3$ or ZrOCl$_2$ alone at varying concentrations. The results are shown in Table 15 below. The titanium salts themselves were not effective as a flocculant at practical concentrations.

TABLE 15

| Amount of addition (mg/L as metal oxide) | Supernatant turbidity | | | | | |
|---|---|---|---|---|---|---|
| | TiC$_4$ | TiOSO$_3$ | Al$_2$(SO$_4$)$_3$ | PAC | FeCl$_3$ | ZrOCl |
| 1 | — | — | 12.3 | 6.8 | 6.0 | — |
| 2 | — | — | 8.3 | 1.8 | 1.0 | — |
| 3 | — | — | 8.5 | 0.6 | — | — |
| 4 | — | — | — | 0.8 | 0.3 | No flock |
| 5 | — | — | — | 0.3 | — | — |
| 6 | — | — | — | 0.3 | 0.2 | No flock |
| 8 | 3.6 | 9.6 | — | 0.8 | 0.1 | 9.0 |
| 9 | 2.6 | 3.0 | — | — | — | — |
| 10 | 1.6 | 1.5 | — | 16.4 | 0.1 | 4.0 |
| 15 | 0.5 | 0.8 | — | — | 10.0 | 1.8 |
| 20 | 0.5 | 1.7 | — | — | — | 20.0 |
| 22 | 18.8 | 3.7 | — | — | — | — |

Example 9

The effects of co-addition of an alkali or alkaline earth metal salt and a titanium salt on the turbidity of supernatant were studied at TiO$_2$/alkali or alkaline earth metal salt ratio of 1, 0.1 and 0.01. The results are shown in Table 16–Table 21.

TABLE 16

TiOSO$_4$, TiO$_2$/co-added salt = 1

| Amount of addition | Turbidity | | | | | |
|---|---|---|---|---|---|---|
| (mg/L as TiO$_2$) | MgCl$_2$ | MgSO$_4$ | Na$_2$SO$_4$ | NaCl | CaCl$_2$ | KCl |
| 8 | 2 | No flock | 3 | 13 | 2 | No flock |
| 6 | No flock | ditto | No flock | No flock | No flock | ditto |
| 4 | ditto | ditto | ditto | ditto | ditto | ditto |
| 2 | 2 | — | — | — | — | — |

TABLE 17

TiOSO$_4$, TiO$_2$/co-added salt = 0.1

| Amount of addition | Turbidity | | | | | |
|---|---|---|---|---|---|---|
| (mg/L as TiO$_2$) | MgCl$_2$ | MgSO$_4$ | Na$_2$SO$_4$ | NaCl | CaCl$_2$ | Kcl |
| 8 | 0.2 | 2 | 4 | 2 | 0.2 | 2 |
| 6 | 0.5 | 5 | No flock | No flock | 0.3 | No flock |
| 4 | 3 | No flock | ditto | ditto | 5 | ditto |
| 2 | No flock | ditto | ditto | ditto | No flock | ditto |

TABLE 18

TiOSO$_4$, TiO$_2$/co-added salt = 0.01

| Amount of addition | Turbidity | | | | | |
|---|---|---|---|---|---|---|
| (mg/L as TiO$_2$) | MgCl$_2$ | MgSO$_4$ | Na$_2$SO$_4$ | NaCl | CaCl$_2$ | Kcl |
| 8 | 0.1 | 0.6 | 2 | 0.2 | 3 | 0.2 |
| 6 | 0.3 | 1.0 | No flock | 2 | 0.2 | 0.5 |
| 4 | 0.5 | 1.5 | ditto | 4 | 1.0 | 3 |
| 2 | 1 | 11 | ditto | No flock | 1.5 | 20 |

TABLE 19

TiCl$_4$, TiO$_2$/co-added salt = 1

| Amount of addition | Turbidity | |
|---|---|---|
| (mg/L as TiO$_2$) | MgSO$_4$ | Na$_2$SO$_4$ |
| 8 | 1 | 2 |
| 6 | 5 | No flock |
| 4 | No flock | " |
| 2 | " | " |

TABLE 20

TiCl$_4$, TiO$_2$/co-added salt = 0.1

| Amount of addition | Turbidity | |
|---|---|---|
| (mg/L as TiO$_2$) | MgSO$_4$ | Na$_2$SO$_4$ |
| 8 | 0.2 | 2 |
| 6 | 0.2 | No flock |
| 4 | 2 | " |

TABLE 21

TiCl$_4$, TiO$_2$/co-added salt = 0.01

| Amount of addition | Turbidity | |
|---|---|---|
| (mg/L as TiO$_2$) | MgSO$_4$ | Na$_2$SO$_4$ |
| 8 | 0.2 | 2 |
| 6 | 0.2 | No flock |
| 4 | 1 | " |
| 2 | 2 | " |

Example 10

The flock-making property of TiCl$_4$—MgCl$_2$ binary system was studied at varying TiO$_2$/MgCl$_2$ ratios and at varying pH levels of supernatant. The amount of TiCl$_4$ was kept at a constant level of 4 mg/L as TiO$_2$. The results are shown in Table 22.

Settlingness was evaluated according to the following schedule.

G: Good; F: Fair; B: Bad

As shown in Table 22, co-addition of MgCl$_4$ at a TiO$_2$/MgCl$_2$ ratio of 0.25 or less achieved satisfactory results in the neutral pH region in terms of flocculation time, settlingness, turbidity and residual Ti.

TABLE 22

TiCl$_4$—MgCl$_2$ at 4 mg/L as TiO$_2$

| | | Supernatant pH | | | | | | |
|---|---|---|---|---|---|---|---|---|
| | | 5.6 | 6.0 | 6.5 | 6.9 | 7.4 | 7.9 | 8.7 |
| TiO$_2$/MgCl$_2$ | Flocculation time (second) | 120 | 120 | — | — | — | 240 | 180 |
| No MgCl$_2$ | Settlingness | G | G | B | B | B | F | G |
| | Turbidity | 1.0 | 1.1 | 20 | 20 | 20 | 2.6 | 2.8 |
| | Residual Ti (mg/L as metal) | 0.35 | 0.42 | 2.16 | 2.27 | 2.17 | 1.15 | 1.19 |
| TiO$_2$/MgCl = 1 | Flocculation time (second) | 120 | 120 | 900 | — | — | 120 | 120 |
| | Settlingness | G | G | B | B | B | G | G |
| | Turbidity | 1.2 | 1.1 | 15.6 | 20 | 20 | 2.1 | 1.6 |
| | Residual Ti (mg/L as metal) | 0.45 | 0.43 | 1.72 | 2.18 | 2.07 | 1.11 | 0.71 |
| TiO$_2$/MgCl$_2$ = 0.25 | Flocculation time (second) | 60 | 60 | 120 | 180 | 120 | 60 | 60 |
| | Settlingness | G | G | G | G | G | G | G |
| | Turbidity | 1.1 | 1.1 | 1.8 | 2.2 | 1.1 | 0.5 | 0.5 |
| | Residual Ti | 0.45 | 0.43 | 0.85 | 1.15 | 0.42 | 0.23 | 0.16 |

TABLE 22-continued

TiCl$_4$—MgCl$_2$ at 4 mg/L as TiO$_2$

| | | Supernatant pH | | | | | | |
|---|---|---|---|---|---|---|---|---|
| | | 5.6 | 6.0 | 6.5 | 6.9 | 7.4 | 7.9 | 8.7 |
| TiO$_2$/MgCl$_2$ = 0.1 | Flocculation time (second) | 60 | 60 | 120 | 120 | 120 | 60 | 60 |
| | Settlingness | G | G | G | G | G | G | G |
| | Turbidity | 1.0 | 1.1 | 0.8 | 1.0 | 0.7 | 0.5 | 0.5 |
| | Residual Ti (mg/L as metal) | 0.42 | 0.46 | 0.32 | 0.45 | 0.34 | 0.21 | 0.24 |
| TiO$_2$/MgCl$_2$ = 0.01 | Flocculation time (second) | 60 | 60 | 60 | 60 | 60 | 60 | 60 |
| | Settlingness | G | G | G | G | G | G | G |
| | Turbidity | 1.1 | 1.1 | 1.0 | 0.8 | 0.5 | 0.3 | 0.9 |
| | Residual Ti (mg/L as metal) | 0.41 | 0.42 | 0.25 | 0.30 | 0.23 | 0.18 | 0.3 |
| TiO$_2$/MgCl$_2$ = 0.004 | Flocculation time (second) | 60 | 60 | 60 | 60 | 60 | 60 | 60 |
| | Settlingness | G | G | G | G | G | G | G |
| | Turbidity | 0.8 | 0.8 | 1.0 | 0.5 | 0.6 | 0.5 | 0.7 |
| | Residual Ti (mg/L as metal) | 0.28 | 0.26 | 0.39 | 0.23 | 0.24 | 0.21 | 0.34 |
| TiO$_2$/MgCl$_4$ = 0.002 | Flocculation time (second) | 60 | 60 | 60 | 60 | 60 | 60 | 60 |
| | Settlingness | G | G | G | G | G | G | G |
| | Turbidity | 1.0 | 1.2 | 1.2 | 0.4 | 0.6 | 0.6 | 0.4 |
| | Residual Ti (mg/L as metal) | 0.44 | 0.46 | 0.48 | 0.18 | 0.26 | 0.28 | 0.27 |
| TiO$_2$/MgCl$_4$ = 0.001 | Flocculation time (second) | 60 | 60 | 60 | 60 | 60 | 60 | 60 |
| | Settlingness | G | G | G | G | G | G | G |
| | Turbidity | 1.2 | 1.1 | 1.1 | 0.5 | 0.4 | 0.6 | 0.8 |
| | Residual Ti (mg/L as metal) | 0.44 | 0.38 | 0.34 | 0.24 | 0.24 | 0.27 | 0.32 |
| TiO$_2$/MgCl$_4$ = 0.0002 | Flocculation time (second) | 60 | 60 | 60 | 60 | 60 | 60 | 60 |
| | Settlingness | G | G | G | G | G | G | G |
| | Turbidity | 1.5 | 1.3 | 1.2 | 0.6 | 0.8 | 0.8 | 1.0 |
| | Residual Ti (mg/L as metal) | 0.54 | 0.50 | 0.44 | 0.23 | 0.28 | 0.33 | 0.42 |

Example 11

Example 10 was followed with respect to TiOSO$_4$—MgCl$_2$ binary system. The results are shown in Table 23. As shown in Table 23, similar results were obtained.

TABLE 23

TiOSO$_4$—MgCl$_2$ at 4 mg/L as TiO$_2$

| | | Supernatant pH | | | | | | |
|---|---|---|---|---|---|---|---|---|
| | | 5.6 | 6.1 | 6.6 | 6.9 | 7.3 | 7.9 | 8.6 |
| No MgCl$_2$ | Flocculation time (second) | 60 | 120 | — | — | — | — | 420 |
| | Settlingness | G | F | B | B | B | B | F |
| | Turbidity | 0.4 | 1.4 | 20 | 20 | 20 | 20 | 5.2 |
| | Residual Ti (mg/L as metal) | 0.16 | 0.63 | 2.09 | 2.16 | 2.08 | 1.99 | 1.41 |
| TiO$_2$/MgCl$_4$ = 1 | Flocculation time (second) | 60 | 120 | — | — | — | — | 300 |
| | Settlingness | G | G | B | B | B | B | F |
| | Turbidity | 0.6 | 1.1 | 20 | 20 | 20 | 20 | 3.8 |
| | Residual Ti (mg/L as metal) | 0.24 | 0.39 | 1.95 | 1.98 | 2.00 | 1.97 | 1.28 |
| TiO$_2$/MgCl$_2$ = 0.25 | Flocculation time (second) | 60 | 60 | 180 | 540 | 180 | 120 | 60 |
| | Settlingness | G | G | F | F | F | G | G |
| | Turbidity | 0.6 | 0.5 | 1.9 | 12.2 | 1.8 | 0.9 | 0.6 |
| | Residual Ti (mg/L as metal) | 0.24 | 0.21 | 0.90 | 1.61 | 0.92 | 0.38 | 0.32 |

TABLE 23-continued

TiOSO$_4$—MgCl$_2$ at 4 mg/L as TiO$_2$

| | | Supernatant pH | | | | | | |
|---|---|---|---|---|---|---|---|---|
| | | 5.6 | 6.1 | 6.6 | 6.9 | 7.3 | 7.9 | 8.6 |
| TiO$_2$/MgCl$_2$ = 0.1 | Flocculation time (second) | 60 | 60 | 120 | 360 | 120 | 120 | 60 |
| | Settlingness | G | G | F | G | G | G | G |
| | Turbidity | 0.6 | 0.5 | 1.2 | 5.0 | 1.2 | 0.6 | 0.3 |
| | Residual Ti (mg/L as metal) | 0.31 | 0.25 | 0.39 | 1.44 | 0.58 | 0.30 | 0.23 |
| TiO$_2$/MgCl$_2$ = 0.01 | Flocculation time (second) | 60 | 60 | 60 | 120 | 60 | 60 | 60 |
| | Settlingness | G | G | G | G | G | G | G |
| | Turbidity | 0.5 | 0.4 | 0.4 | 0.4 | 0.4 | 0.2 | 0.2 |
| | Residual Ti (mg/L as metal) | 0.24 | 0.21 | 0.19 | 0.20 | 0.12 | 0.18 | 0.13 |
| TiO$_2$/MgCl4 = 0.004 | Flocculation time (second) | 60 | 60 | 60 | 120 | 60 | 60 | 60 |
| | Settlingness | G | G | G | G | G | G | G |
| | Turbidity | 0.5 | 0.4 | 0.4 | 0.4 | 0.4 | 0.2 | 0.2 |
| | Residual Ti (mg/L as metal) | 0.19 | 0.14 | 0.14 | 0.17 | 0.12 | 0.11 | 0.14 |
| TiO$_2$/MgCl$_4$ = 0.002 | Flocculation time (second) | 60 | 60 | 60 | 120 | 60 | 60 | 60 |
| | Settlingness | G | G | G | G | G | G | G |
| | Turbidity | 0.5 | 0.4 | 0.4 | 0.3 | 0.4 | 0.3 | 0.2 |
| | Residual Ti (mg/L as metal) | 0.23 | 0.20 | 0.18 | 0.17 | 0.19 | 0.14 | 0.13 |
| TiO$_2$/MgCl$_2$ = 0.001 | Flocculation time (second) | 60 | 60 | 60 | 120 | 60 | 60 | 60 |
| | Settlingness | G | G | F | G | G | G | G |
| | Turbidity | 0.5 | 0.5 | 0.4 | 0.3 | 0.4 | 0.4 | 0.5 |
| | Residual Ti (mg/L as metal) | 0.22 | 0.24 | 0.20 | 0.14 | 0.18 | 0.22 | 0.24 |
| TiO$_2$/MgCl$_2$ = 0.0002 | Flocculation time (second) | 60 | 60 | 60 | 120 | 60 | 60 | 60 |
| | Settlingness | G | G | F | G | G | G | G |
| | Turbidity | 0.6 | 0.5 | 0.5 | 0.5 | 0.6 | 0.6 | 0.6 |
| | Residual Ti (mg/L as metal) | 0.24 | 0.18 | 0.21 | 0.17 | 0.20 | 0.25 | 0.26 |

What is claimed is:

1. A water-clarifying method comprising the steps of:

(a) adding into raw water with stirring an aqueous solution of titanyl sulfate or titanium chloride and a water-soluble, neutral alkali or alkaline earth metal salt at a titanium to alkali or alkaline earth metal salt ratio calculated as TiO$_2$ of from 0.25:1 to 0.0002:1 by weight, wherein, if water-soluble iron, zirconium and/or aluminum salts are also added to said raw water, the ratio of titanium to iron, zirconium or aluminum salt, calculated as TiO$_2$ and Fe$_2$O$_3$, ZrO$_2$, or Al$_2$O$_3$, respectively, is from 5:1 to 40:1 by weight;

(b) allowing suspended matter in the raw water to aggregate into flocks at a pH from 5.6 to 8.7;

(c) allowing the flocks to settle; and (d) separating the supernatant from the flocks.

2. The water-clarifying method according to claim 1 wherein said alkali or alkaline earth metal is sodium chloride, sodium sulfate, potassium chloride, calcium chloride, magnesium chloride or magnesium sulfate.

3. The water-clarifying method according to claim 1 wherein said titanium to alkali or alkaline earth metal salt ratio is from 0.25:1 to 0.01:1 by weight.

4. The water-clarifying method according to claim 1 wherein a water-soluble iron salt is further added to raw water in step (a).

5. The water-clarifying method according to claim 4 wherein said water-soluble iron salt is ferrous sulfate, ferric sulfate, ferrous chloride, ferric chloride or polymeric ferric chloride.

6. The water-clarifying method according to claim 1 wherein a water-soluble zirconium salt is further added to raw water in step (a).

7. The water-clarifying method according to claim 6 wherein said water-soluble zirconium salt is zirconium dichloride oxide, zirconium chloride hydroxide oxide or zirconium sulfate.

8. The water-clarifying method according to claim 1 wherein a water-soluble aluminum salt is further added to raw water in step (a).

9. The water-clarifying method according to claim 8 wherein said water-souble aluminum salt is alminum chloride, polymeric aluminum chloride or aluminum sulfate.

10. The water-clarifying method according to claim 1 wherein said aqueous solution of titanyl sulfate or titanium tetrachloride is added to raw water to a titanium concentration calculated as TiO$_2$ from 1 to 200 mg/L.

11. The water-clarifying method according to claim 10 wherein said titanium concentration calculated as TiO$_2$ is from 1 to 10 mg/L.

12. The water-clarifying method according to claim 10 wherein step (a) is performed by either adding stock solutions of respective chemicals concurrently to the raw water or adding a premix of the stock solutions to the raw water.

13. A water-clarifying method comprising the steps of:

(a) adding into raw water with stirring an aqueous solution of a composition consisting essentially of titanyl sulfate or titanium chloride and a water-soluble, neutral alkali or alkaline earth metal salt at a titanium to alkali or alkaline earth metal salt ratio calculated as $TiO_2$ of from 0.25:1 to 0.0002:1 by weight;

(b) allowing suspended matter in the raw water to aggregate into flocks at a pH from 5.6 to 8.7;

(c) allowing the flocks to settle; and (d) separating the supernatant from the flocks.

14. A water-clarifying method according to claim 1 wherein said alkali or alkaline earth metal salt is sodium chloride, sodium sulfate, potassium chloride, calcium chloride, magnesium chloride or magnesium sulfate.

15. A water-clarifying method according to claim 1 wherein said titanium to alkali or alkaline earth metal salt ratio is from 0.25:1 to 0.01:1 by weight.

16. A water-clarifying method according to claim 1 wherein said aqueous solution is added to raw water to a titanium concentration calculated as $TiO_2$ from 1 to 200 mg/L.

17. A water-clarifying method according to claim 16 wherein said titanium concentration calculated as $TiO_2$ is from 1 to 10 mg/L.

18. A water-clarifying method according to claim 1 wherein step (a) is performed by either adding stock solutions of respective chemicals concurrently to the raw water or adding a premix of the stock solutions to the raw water.

19. A water-clarifying method comprising the steps of:

(a) adding into raw water with stirring an aqueous solution of a composition consisting essentially of (i) titanyl sulfate or titanium chloride, (ii) a water-soluble, neutral alkali or alkaline earth metal salt, and (iii) a water soluble iron or zirconium or aluminum salt at a titanium to alkali or alkaline earth metal salt ratio calculated as $TiO_2$ and $Fe_2O_3$ or $ZrO_2$ or $Al_2O_3$ of from 1:1 to 40:1 by weight;

(b) allowing suspended matter in the raw water to aggregate into flocks at a pH from 5.6 to 8.7;

(c) allowing the flocks to settle; and (d) separating the supernatant from the flocks.

20. The water-clarifying method according to claim 19 wherein said alkali or alkaline earth metal salt is sodium chloride, sodium sulfate, potassium chloride, calcium chloride, magnesium chloride or magnesium sulfate.

21. The water-clarifying method according to claim 19 wherein said iron or zirconium or aluminum salt is ferrous sulfate, ferric sulfate, ferrous chloride, ferric chloride, polymeric ferric chloride, zirconium dichloride oxide, zirconium chloride hydroxide oxide, zirconium sulfate, aluminum chloride, polymeric aluminum chloride or aluminum sulfate.

22. The water-clarifying method according to claim 19 wherein said titanium to alkali or alkaline earth metal salt ratio is from 0.25:1 to 0.01:1 by weight.

23. The water-clarifying method according to claim 19 wherein said aqueous solution is added to raw water to a titanium concentration calculated as $TiO_2$ from 1 to 200 mg/L.

24. The water-clarifying method according to claim 23 wherein said titanium concentration calculated as $TiO_2$ is from 1 to 10 mg/L.

25. The water-clarifying method according to claim 23 wherein step (a) is performed by either adding stock solutions of respective chemicals concurrently to the raw water or adding a premix of the stock solutions to the raw water.

* * * * *